(12) United States Patent
Usui

(10) Patent No.: US 7,524,392 B2
(45) Date of Patent: Apr. 28, 2009

(54) BONDING METHOD USING CAPILLARY CONDENSATION EFFECT

(75) Inventor: Shoichiro Usui, Senda (JP)

(73) Assignee: Usui Kokusai Sangyo Kaisha, Ltd., Shizuoka (JP)

( * ) Notice: Subject to any disclaimer, the term of this patent is extended or adjusted under 35 U.S.C. 154(b) by 54 days.

(21) Appl. No.: 10/392,569

(22) Filed: Mar. 20, 2003

(65) Prior Publication Data

US 2004/0084142 A1    May 6, 2004

(30) Foreign Application Priority Data

Apr. 1, 2002    (JP) ............................. 2002-098227

(51) Int. Cl.
*C09J 5/00* (2006.01)

(52) U.S. Cl. .................... 156/305; 156/308.6

(58) Field of Classification Search ................ 156/305, 156/308.6, 309.3
See application file for complete search history.

(56) References Cited

U.S. PATENT DOCUMENTS

| | | | | | |
|---|---|---|---|---|---|
| 2,154,185 | A | * | 4/1939 | Robie | .......................... 264/123 |
| 3,278,354 | A | * | 10/1966 | Wennin | ....................... 156/215 |
| 3,308,226 | A | * | 3/1967 | Simjian | ....................... 264/245 |
| 3,471,353 | A | * | 10/1969 | Rasmussen | .................. 156/289 |
| 4,137,117 | A | * | 1/1979 | Jones | .......................... 156/294 |
| 5,604,335 | A | * | 2/1997 | Isahaya | .................. 177/210 FP |
| 6,521,481 | B1 | * | 2/2003 | Chen et al. | .................... 438/108 |
| 6,686,207 | B2 | * | 2/2004 | Tupper et al. | ................ 436/174 |

OTHER PUBLICATIONS

IUPAC Compendium of Chemical Terminology, 2nd Edition, 1997.*

* cited by examiner

*Primary Examiner*—Richard Crispino
*Assistant Examiner*—Michael A Tolin
(74) *Attorney, Agent, or Firm*—William L. Androlia; H. Henry Koda

(57) ABSTRACT

As an efficient and economical bonding method indispensable for the bonding between dimension-small constituent elements (members, parts) to manufacture a minute (micro) structure, a micromachine, etc. is provided a bonding method using a capillary condensation effect characterized in that in order to bond at least two separated bonding targets (works) at a prescribed joint point, the bonding targets are disposed under an atmosphere comprising a prescribed vapor pressure of adhesive agent, and the adhesive agent is subjected to capillary condensation at the joint point to thereby form uniform meniscus and bond the bonding targets (works) by the adhesive agent constituting the meniscus.

4 Claims, 6 Drawing Sheets

BONDING METHOD USING CAPILLARY CONDENSATION EFFECT

TECHNICAL FIELD

The present invention aims to provide a novel joint method that is effective particularly when elements (members, parts) constituting a minute structure (hereinafter referred to as micro ($\mu$) structure or micro-structure) are bonded to each other.

More particularly, the present invention aims to provide a new joint method for joint minute elements (members, parts) to each other by making meniscus of adhesive agent stably occur at the joint point (contact point) between the minute elements by capillary condensation as a joint method for these minute elements (members, parts) when a micro structure is manufactured, produced by using the minute elements (members, parts) whose dimension is reduced more and more.

BACKGROUND ART

Recently, the microstructure design of equipment or constituent elements (members, parts) thereof has been developed as the term "micro-machine" has been used.

For example, a micro-motor, a micro turbine, a gear train, etc. whose diameter is not more than 0.1 mm are manufactured by MEMS (Micro Electro Mechanical System) based on a batch fabrication system to which the semiconductor apparatus process is applied. It is needless to say that a micro-machine is constructed by fabricating these minute elements (members, parts).

Furthermore, mobilization of PC (personal computer) and increase in the capacity of a file due to high performance of CPU (central processing unit) has promoted developments of magnetic recording apparatus which are light in weight and large incapacity, and the constituent elements (members, parts) thereof have been designed to be minute.

In the field using micro ($\mu$) structures such as micro-machines, etc., various methods such as a soldering method containing a wire bonding method, a diffusion bonding method under high-temperature and vacuum atmosphere for silicon type materials, etc. are used to bond micro ($\mu$) size structures (members, parts).

When considering the fixing point (joint point) between two fixing targets from the viewpoint of "micro" in a micro ($\mu$) structure whose size (dimension) is more minute, the surfaces thereof have minute uneven structures, and thus the problem is addressed to the fixing (bonding) at the surface (or points) where these microstructures come into true contact with each other, in other words, the selective fixing (bonding) at only the true joint surface or true joint points. Originally, from the viewpoint of the fixing (adhesion) strength, it is needless to say that the selective fixing (bonding) at the true joint surface (points) is preferable.

As described above, welding such as wire bonding or the like, soldering or fixing or other methods are improper as the fixing (bonding) means of minute structures from the viewpoint of reliability and economical efficiency.

DISCLOSURE OF THE INVENTION

The present invention has been invented in view of the limitation of the prior art described above.

The inventor of this application has enthusiastically made studies on a method of firmly and economically bonding respective constituent elements (members, parts) of a minute structure, for example, a micro ($\mu$) structure whose dimension is equal to several millimeters or less.

As a result of the studies to overcome system-down and reduction in lifetime due to high friction and intensive wear which are induced by "inter-surface force" (the main force thereof is "meniscus force", described in detail later) acting between two surfaces of sliding portions which make relative motions under a light weight, the inventor has achieved a knowledge that meniscus of adhesive agent can be stably formed at the contact portion (joint portion) of minute elements (members, parts), whereby the minute elements (members, parts) can be firmly bonded to each other.

The present invention has been invented on the basis of this knowledge.

According to the present invention, a novel bonding method using a capillary condensation effect in which meniscus based on capillary condensation of adhesive agent is formed at the joint point between both the elements (members, parts) and both the elements (members, parts) is firmly and economically bonded to each other by adhesive agent contained in the meniscus concerned is provided as a method of bonding respective elements (members, parts) of a minute (micro) structure whose dimension is equal to several millimeters or less, or respective elements (members, parts) of a minute structure in which the ratio of a true contact area and an apparent contact ratio is in such an order as to be 1/25,000 or less, in other words, as a method of bonding elements whose contact surface structures are near to the mirror-surface structure and thus which have great "inter-surface force" action.

Briefly describing the present invention, the present invention relates to a bonding method for bonding at least two separated bonding targets at a prescribed joint point, which uses a capillary condensation effect that adhesive agent (the term of adhesive agent in this invention should be most broadly interpreted as described in detail later) is subjected to capillary condensation at the prescribed joint point and its neighboring site (hereinafter merely referred to as joint point) of the bonding targets and also the bonding targets are bonded to each other at the joint point by the adhesive agent.

Describing more specifically, a first method of the bonding method using the capillary condensation effect according to the present invention relates to a bonding method in which the bonding targets are disposed under an atmosphere comprising a prescribed vapor pressure of adhesive agent, and also the adhesive agent is subjected to capillary condensation at the joint point to form meniscus, whereby the bonding targets are bonded to each other by the adhesive agent constituting the meniscus.

Furthermore, a second method of the bonding method using the capillary condensation effect according to the present invention relates to a bonding method in which the adhesive agent comprises two components including adhesive material and hardening material for hardening the adhesive material, meniscus based on capillary condensation of the adhesive material is formed at a first stage, meniscus based on capillary condensation of the hardening material is further formed on the surface of the meniscus of the adhesive material at a second stage, and finally the adhesive material is hardened by the hardening material to bond the bonding targets.

Still furthermore, a third method of the bonding method using the capillary condensation effect according to the present invention relates to a bonding method in which a fluid adhesive material layer is formed at the joint point of at least one bonding target in advance, meniscus is formed at the joint point by migration of the fluid adhesive material layer at a first stage, meniscus based on capillary condensation of the hardening material for hardening the adhesive material is further formed on the surface of the meniscus of the adhesive material at a second stage, and finally the adhesive material is hardened by the hardening material to bond the bonding targets.

Figure 1:
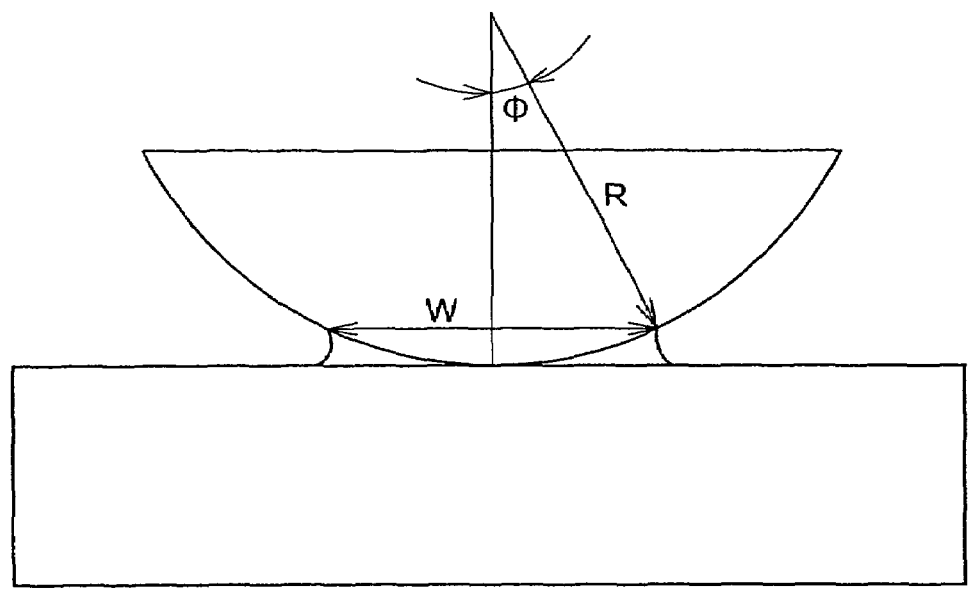
FIG. 1 is a diagram showing formation of meniscus based on capillary condensation and meniscus force.

In the respective figures, the meaning of reference numerals is as follows.

A. Bonding apparatus (for executing the bonding method using the capillary condensation effect)
  1 chamber (1)
  2 chamber (2)
  3 humidifier
  4 gas cylinder for atmosphere (nitrogen gas cylinder)
  11 bonding target (work) fixing jig
  1a, 1b work fixing jig
  a, b work
  1a1, 1b1 movable stage
  1c movable stage board

BEST MODE FOR CARRYING OUT THE INVENTION

The technical construction and embodiments of the present invention will be described in detail.

The new bonding method using the capillary condensation effect according to the present invention has been invented on the basis of reversing of thinking from studies of the inventor to overcome system-down and reduction in lifetime due to high friction and intensive wear caused by "inter-surface force" acting between two surfaces of sliding portions of a micro (μ) structure (minute structure), particularly "meniscus force" as described above.

In order to clarify the understanding of the technical construction of this invention, in the first place the summary of the studies of the inventor of this application to overcome the "inter-surface force (mainly meniscus force)" in the micro (μ) structure will be described.

a) In the field handling the minute "micro (μ)" structure, a manipulation technique and a system design theory which have been hitherto developed in connection with "macro" (huge) structures are of no use.

b) This is because the "inter-surface force" which has been neglected in the "macro" field takes a large action, and thus the physical phenomenon is greatly varied. That is, the mass is reduced in proportion to the cubic of the dimension, however, the surface area is reduced in proportion to the square of the dimension. Therefore, the "inter-surface" force which is proportional to the surface area has a relatively large effect than the force of gravity and the inertial force which are proportional to the volume.

c) A specific example of the "inter-surface force" is the phenomenon that "meniscus force" caused by atomic force or surface tension of fluid acts as "adhering force" (note) "between the two surfaces" which are disposed to be adjacent to each other or come into contact with each other.

(note) More strictly, the "adhering force" acting "between two surfaces" is classified into three factors: (1) van der Waals force, (2) electrostatic force and (3) meniscus force (adhering force based on liquid bridging). Of these factors, "meniscus force" contributes to most of problems occurring at the manufacturing and operation stages of "micro (μ)" structures.

d) Accordingly, when "inter-surface force", that is, "meniscus force" acts "between two surfaces" which relatively move under light weight, such as sliding portions of a "micro (μ) structure (a magnetic storage apparatus, a micro-machine or the like as described above), high friction and intensive wear are induced, and the problem of system-down and reduction in lifetime occurs.

e) A texturing method (texturing) to make the surface have a proper roughness or the like is proposed as a countermeasure for overcoming the "inter-surface force (meniscus force)" in the "micro (μ) structure, that is, as a counter measure for reducing "meniscus force".

In connection with further minuteness of a minute (micro) mechanical system, studies in which greater importance is placed on the surface roughness from micro-meter (μm) scale to nanometer (nm) scale is promoted in the texturing method.

The summary of the occurrence mechanism of "meniscus" and the adhering force ("meniscus force") based on the "meniscus" will be described hereunder.

1) FIG. 1 shows "meniscus" formed in the neighborhood of the contact point when a surface-smooth sphere having a radius of R and a surface-smooth flat plane come into contact with each other and "liquid" exists in the neighborhood of the contact point.

Figure 2:
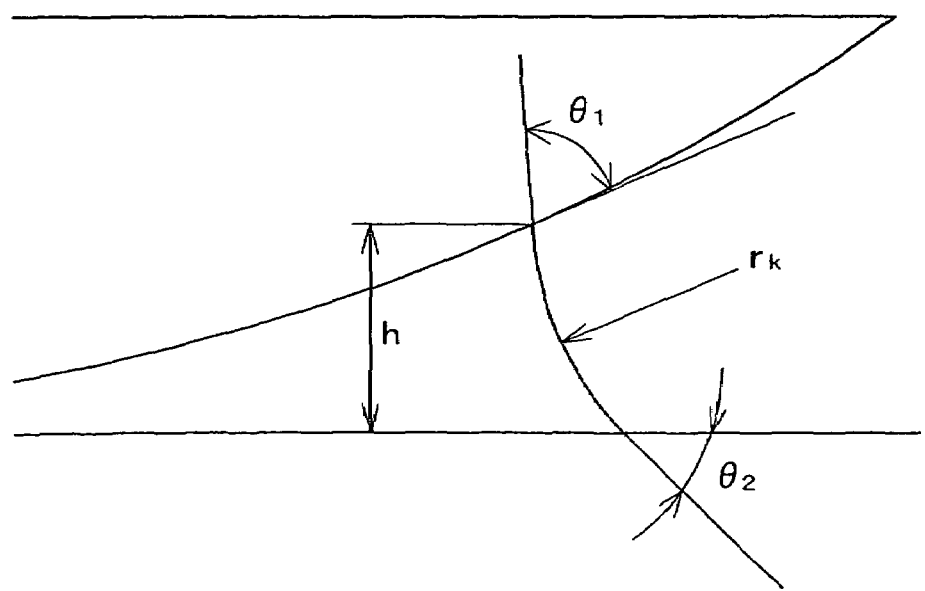
FIG. 2 is an enlarged view showing the main part of FIG. 1.

FIG. 2 is an enlarged view showing the main part of FIG. 1.

2) As the occurrence mechanism of the "meniscus" as described above may be considered capillary condensation from humid atmosphere, and migration of liquid which has already existed on the surface.

3) At the contact portion between two faces whose surfaces are kept under dry state, the former, that is, the capillary condensation from humid atmosphere (thermodynamic equilibrium process) is the main mechanism of occurrence of meniscus.

In this case, the meniscus radius (r1) is equal to the Kelvin radius (rκ) (r1=rκ), and the Kelvin radius (rκ) is represented by the following equation (see FIG. 1).

$$r\kappa = \gamma V/[R_g T \log(p/p_s)] \quad (1.1)$$

γ: surface energy of water
V: mole volume (volume per molecule)
Rg: gas constant
T: absolute temperature
p: vapor pressure of water
ps: saturated vapor pressure of water
p/ps: relative vapor pressure At 20° C., $\gamma V/[R_g T]=0.54$ nm, and thus the Kelvin radius (rκ) is represented by the following equation.

$$r\kappa = 0.54/[\log(p/p_s)] \quad (1.2)$$

4) In FIGS. 1 and 2, the meniscus height (h) and the meniscus diameter (w) under equilibrium state are represented by the following equations.

$$h = r\kappa(\cos\theta_1 + \cos\theta_2) \quad (1.3)$$

$$W = 2\sqrt{2Rh} \quad (1.4)$$

$\theta_1, \theta_2$: the contact angles of water to the sphere and the flat surface R: Radius of the contacted sphere 5) The adhering force ("meniscus force") "Fp" based on the meniscus having the magnitude as described above corresponds to the product of Laplace pressure ($\gamma/r\kappa$) and the action area $[\pi\cdot(W/2)^2]$, and is represented by the following equation.

$$Fp = 2\pi R\gamma(\cos\theta_1 + \cos\theta_2) \quad (1.5)$$

The vector of the meniscus force (Fp) acts in a direction along which the two flat surfaces attract each other.

As described above, the new bonding method using the capillary condensation according to the present invention has been invented on the basis of the technical idea at the utterly opposite side to the policy of the studies for overcoming the system-down and the reduction in lifetime of the microstructure due to meniscus force acting between the two surfaces such as the sliding portions of the minute (micro) structure, for example, the policy of the studies for reducing the meniscus force by the optimum texturing method (texturing) in the micro-system.

That is, conversely to the policy of eliminating the meniscus force in a microstructure or a micro-mechanical system, the present invention has been invented in the policy of fixing two surfaces by increasing the meniscus force.

The present invention has been implemented on the basis of the reversing idea, and it forms the core of the invention how stably the meniscus of adhesive agent is formed at an occurrence site of meniscus force, in other words, at a preset minute joint point of the respective elements of a minute (micro) structure and how firmly the elements are fixed to each other at the joint point by the adhesive agent contained in the meniscus concerned.

The present invention positively uses the meniscus-formed site as a joint point (bonding point) in the minute (micro) structure and the micro-mechanical system as described above.

The bonding method using the capillary condensation effect of the present invention is applicable to the bonding between respective elements (members, parts) of a minute (micro) structure, and the bonding target is not limited to a special one insofar as it produces meniscus by the capillary condensation of adhesive agent (in this invention, the term "adhesive agent" should be broadly interpreted as described later) at a predetermined joint point of these element systems.

For example, in a system in which a surface-smooth sphere and a surface-smooth flat surface come into contact with each other under a desired humid atmosphere, meniscus occurs by the capillary condensation (thermodynamic equilibrium process) at the contact portion.

In the present invention, the contact targets such as the sphere, the flat member, etc. which have smooth surfaces are bonded to each other through the meniscus, and it is preferable that the dimensions thereof are set to desired ones from the viewpoint of achieving bonding structures having excellent adhesion strength.

The term of the surface-smooth sphere in the present invention means an object having a curved convex surface, an object which looks smooth in macro scale, but has a minute uneven surface in micro scale, etc., and it should be most broadly interpreted.

From the above viewpoint, the contact target to which the bonding method using the capillary condensation of the present invention is applied, particularly the surface characteristic and dimension of the contact target will be described. The adhesion strength has strong correlation with the volume of meniscus formed and the performance of the adhesive agent, and thus it should be considered as one of the measures to define the bonding target from the viewpoint of only the dimension.

First, a bonding mechanism in a macro system and then a bonding mechanism in a minute, micro system which the present invention targets will be described.

In the macro system, for example, in a system in which the size of bonding targets (works) ranges from several tens of centimeters order to several meters order, the number of projections contributing to the contact at the joint point between works and the contact area thereof are smaller than appearance, and most of the force acting on the surfaces thereof is dominantly occupied by the inertial force and the force of gravity. Therefore, the bonding method using the capillary condensation effect cannot achieve sufficient adhering force (adherence strength). However, by way of exception, when water intrudes into the gap between two slide glasses (the slide glass has a mirror-surface structure and the surface thereof is extremely smooth) or the like, abnormal adhering strength is exhibited. Accordingly, a case where the surface is extremely smooth is an exception even in the macro system.

On the other hand, in the micro system, sufficient adhering strength can be achieved by only the adhesion at a small number of true contact points because the working precision for microstructuring is enhanced (the surface smoothness degree is kept), the inter-surface force takes a more dominate role as compared with the inertial force and the force of gravity in the micro system, etc.

In the bonding method using the capillary condensation according to the present invention, the size of the bonding target (work) is preferably set to a dimension of several millimeters (mm) or less in the case of the bonding of a sphere element and a flat-surface element.

The rough-standard dimension of the size of the bonding target (work) according to the present invention will be described with reference to FIGS. 1 and 2.

Now, the rough-standard dimension of the size of the bonding target of the present invention will be described by applying a bonding method in which bonding targets (works) of a silicon-nitride ball (sphere) and a silicon-nitride plate (flat plate) having extremely smooth surfaces are disposed in a chamber on which atmospheric control (particularly, vapor pressure control of adhesive agent) can be carried out, meniscus of adhesive agent is formed at the joint point therebetween by the capillary condensation effect and then the adhesive agent is hardened.

In the bonding method described above, it is assumed that the adhering force (meniscus force, Fp) with which the work (sphere) is stably bonded is the same tensile load as the weight of the work (sphere) and it is stable. The contact angles ($\theta_1$, $\theta_2$) to the works are set to 30 degrees, and the adhesion strength of the tensile per unit area is equal to 10 Mpa.

On the basis of the above assumption, a possible area (bonding possible area) in which the work (sphere) is stably bonded is calculated according to the relationship between the radius R (mm) of the work (sphere) and the relative vapor pressure (P/Ps) of the atmosphere (adhesive agent). The result is shown in FIG. 3.

Figure 3:
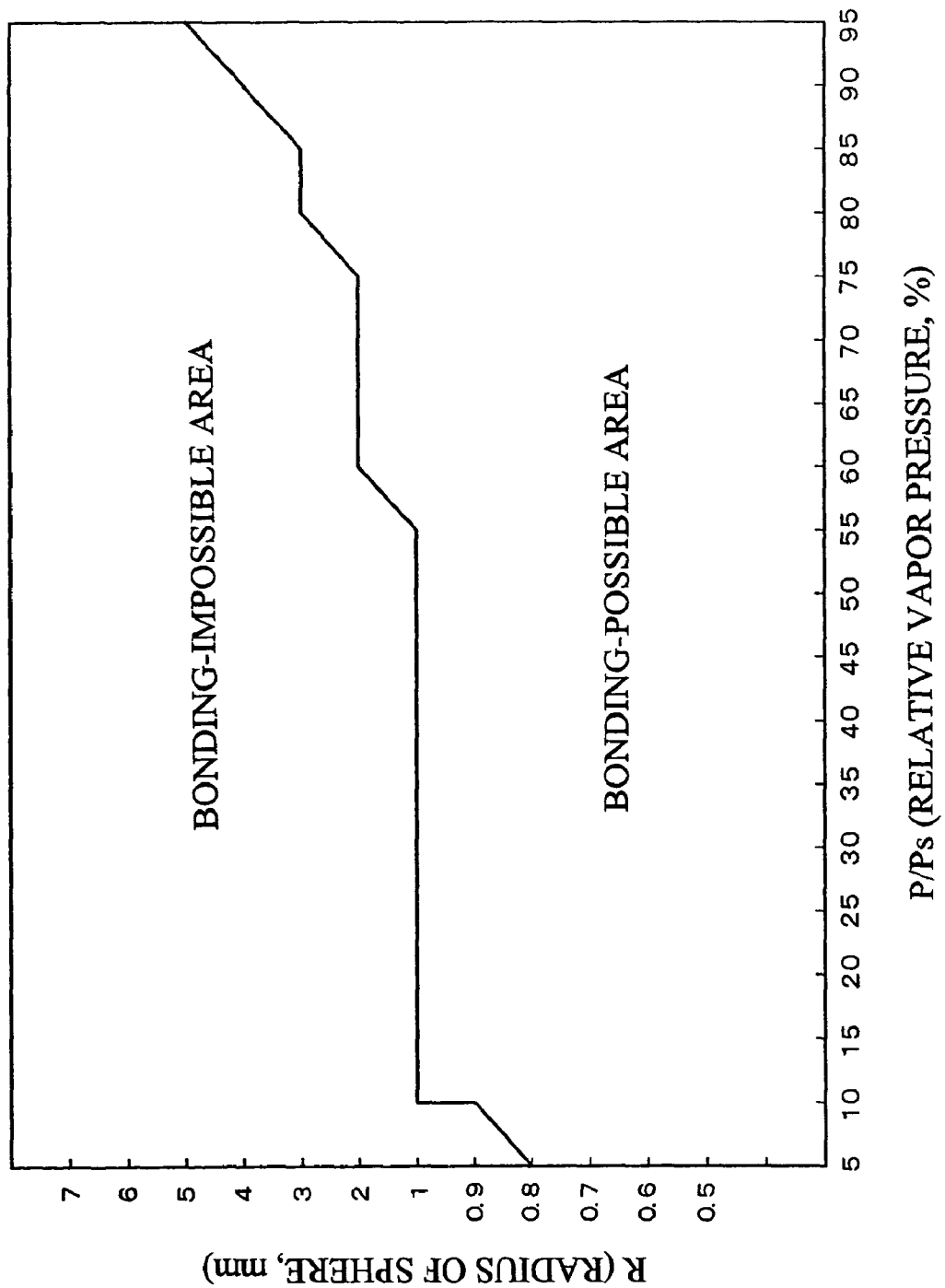
FIG. 3 is a graph showing a contact area in terms of the relationship between R (spherical radius of work) and P/Ps (relative vapor pressure %).

From FIG. 3, the following is found out.

(1) Under the above assumption, the work (sphere) is stably bonded until the amount corresponding to the sphere radius of about 5 mm.

(2) As the dimension of the work (sphere) is increased, the relative vapor pressure of the atmosphere needed for the bonding is increased.

In the case of the radius 5 mm of the work (sphere), the ratio (A/W) of the bonding area (A) of the work (sphere) and the weight (W) thereof is equal to $3.0 \times 10^{-9}$ (m$^2$/g), and if the ratio is not less than this value, the work (sphere) can be stably bonded.

The size of the bonding target (work) applied to the bonding method of this invention will be described from another side.

From many observations of Atomic Force Micrometer AFM (Atomic Force Micrometer), if it is assumed that the bonding targets come into contact with each other through the flat surfaces thereof, it is observed that the vapor composition forms a meniscus efficiently by capillary condensation when the ratio (S1/S2) of the true contact area (S1) to the apparent contact area (S2) is in the order of 1/25,000.

It is observed that the volume of the meniscus is sharply increased when the ratio of the vapor pressure to the saturated vapor pressure exceeds 60%. Accordingly, at the above relative vapor ratio or more, the adhesion strength is sufficient. As described later, when the adhesive agent is the vapor composition of the atmosphere, the vapor pressure of the adhesive agent to the saturate vapor pressure is preferably equal to 60% or more in connection with the adhesion strength.

According to the present invention, the bonding method using the capillary condensation effect can be applied to the bonding targets for which the ratio $(S_1/S_2)$ of the true contact area $(S_1)$ to the apparent contact area $(S_2)$ is in the order of 1/25,000 (in other words, the bonding targets having extremely smooth surfaces), and the bonding targets can be stably bonded to each other by subjecting liquid having adhesive property to capillary condensation in the neighborhood of the projections which are truly brought into contact with each other.

The bonding targets (works) to which the bonding method using the capillary condensation effect is applicable are not limited to those targets having extremely smooth surfaces for which the ratio $(S_1/S_2)$ is in the order to 1/25,000. S1 (true contact area) represents the true contact area formed by prescribed projections (convex portions) at the initial stage when the works are brought into contact with each other at the joint point.

As described above, the adhesion strength correlates with the thickness and volume of the meniscus formed at the joint point, and the thickness and volume of the meniscus are in close relationship with the relative vapor pressure (P/Ps) of the adhesive agent component of the atmosphere.

Therefore, by increasing the relative vapor pressure (P/Ps) of the adhesive agent component to increase the meniscus thickness, objects having surface roughness in which extremely minute projections (convex portions) which do not contribute to the bonding at the initial stage (under the state before the relative vapor pressure is increased) are enabled to contribute to the bonding can be used as bonding targets (works).

There will be described works having projections (convex portions) which are brought into true contact with each other at the initial stage where the works are brought into contact with each other at a predetermined joint point, and also projections (convex portions) which are enabled to contribute to the bonding by increasing the meniscus thickness.

A work having this type of surface roughness will be referred to as a rough surface work, and the roughness degree of the surface should be understood in the relative relationship with a surface-smooth work of S1 (true contact area).

Figure 4:
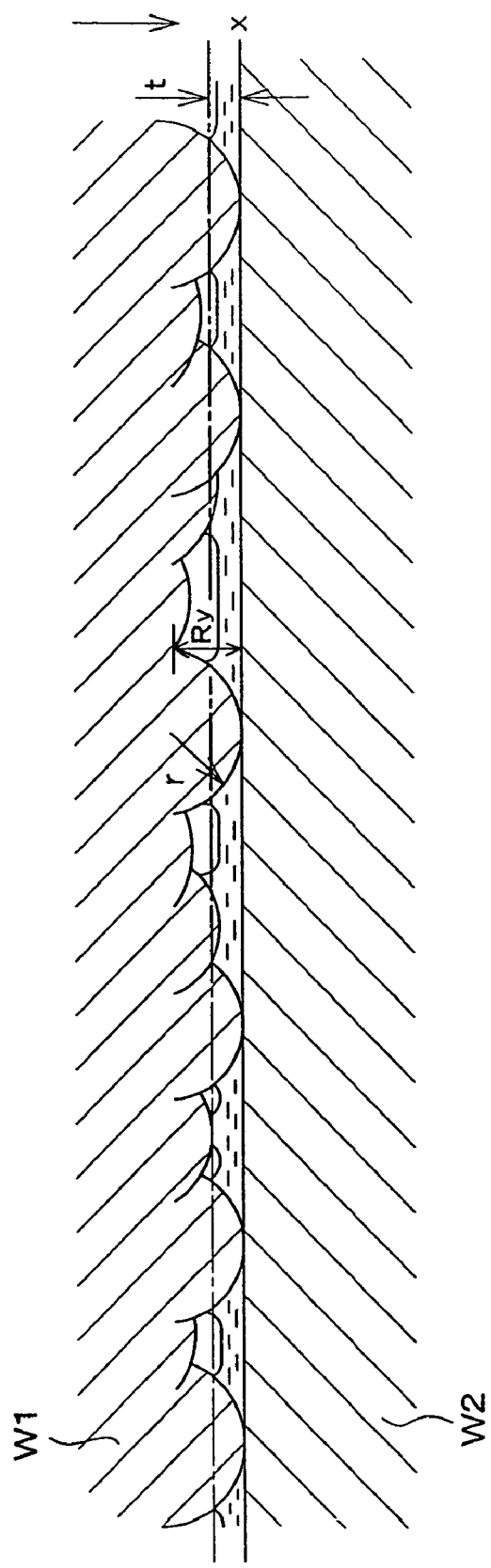
FIG. 4 is a schematic diagram showing the joint portion between a work having rough surface and a work having smooth surface.

FIG. 4 is a diagram showing the surface characteristic of the work having the above feature. In FIG. 4, $W_1$ represents a surface-rough work, and $W_2$ represents a surface-smooth work.

With respect to the surface-rough work $(W_1)$, it is assumed that the height ($\delta$) of the projections (convex portions) existing on the surface is conformed with the normal distribution and the tip portions thereof have a tip radius (r). It is now assumed that the meniscus area of each area is represented by Ai and the adhering force per unit area is represented by fg, the total adhesion strength is represented by the equation 1. It is needless to say that the integration area of the equation 1 is the overall area ($\Omega$) of the bonding.

$$\int_\Omega F_g = \sum f_g A_i \qquad \text{[Equation 1]}$$

If it is satisfied that the height ($\delta$) of the projections existing on the surface is conformed with the normal distribution, the maximum height of the projections on the surface is represented by (Ry) and the height of meniscus under some vapor pressure is represented by (t), the probability in which a projection being noted on the surface is corroded by (immersed in) meniscus is represented by the following equation 2.

In the equation 2, x represents the height of the projection, $\mu$ represents an expected value, and $\sigma$ represents a standard deviation.

$$\int_{Ry-t}^{\infty} \frac{1}{\sqrt{2\pi}\,\sigma} \exp\left[-\frac{1}{2}\left(\frac{x-\mu}{\sigma}\right)^2\right] \qquad \text{[Equation 2]}$$

Representing the total number of the projections in the bonding area ($\Omega$) being noted by (N), the number (Nm) of projections to be corroded (immersed) by the meniscus is represented by the following equation 3.

$$N_m = N \int_{Ry-t}^{\infty} \frac{1}{\sqrt{2\pi}\,\sigma} \exp\left[-\frac{1}{2}\left(\frac{x-\mu}{\sigma}\right)^2\right] \qquad \text{[Equation 3]}$$

Furthermore, representing the area of the bonding area by (An), the area (Am) at which the meniscus is formed is represented by the equation 4.

$$A_m = A_n \int_{Ry-t}^{\infty} \frac{1}{\sqrt{2\pi}\,\sigma} \exp\left[-\frac{1}{2}\left(\frac{x-\mu}{\sigma}\right)^2\right] \qquad \text{[Equation 4]}$$

Here, the relationship between the meniscus height (t) and the relative vapor pressure (P/Ps) of acetone and cyanoacrylate type adhesive agent is theoretically calculated on the assumption that the contact angles ($\theta_1$, $\theta_2$) between each work and the adhesive agent are equal to 30 degrees.

Figure 5:
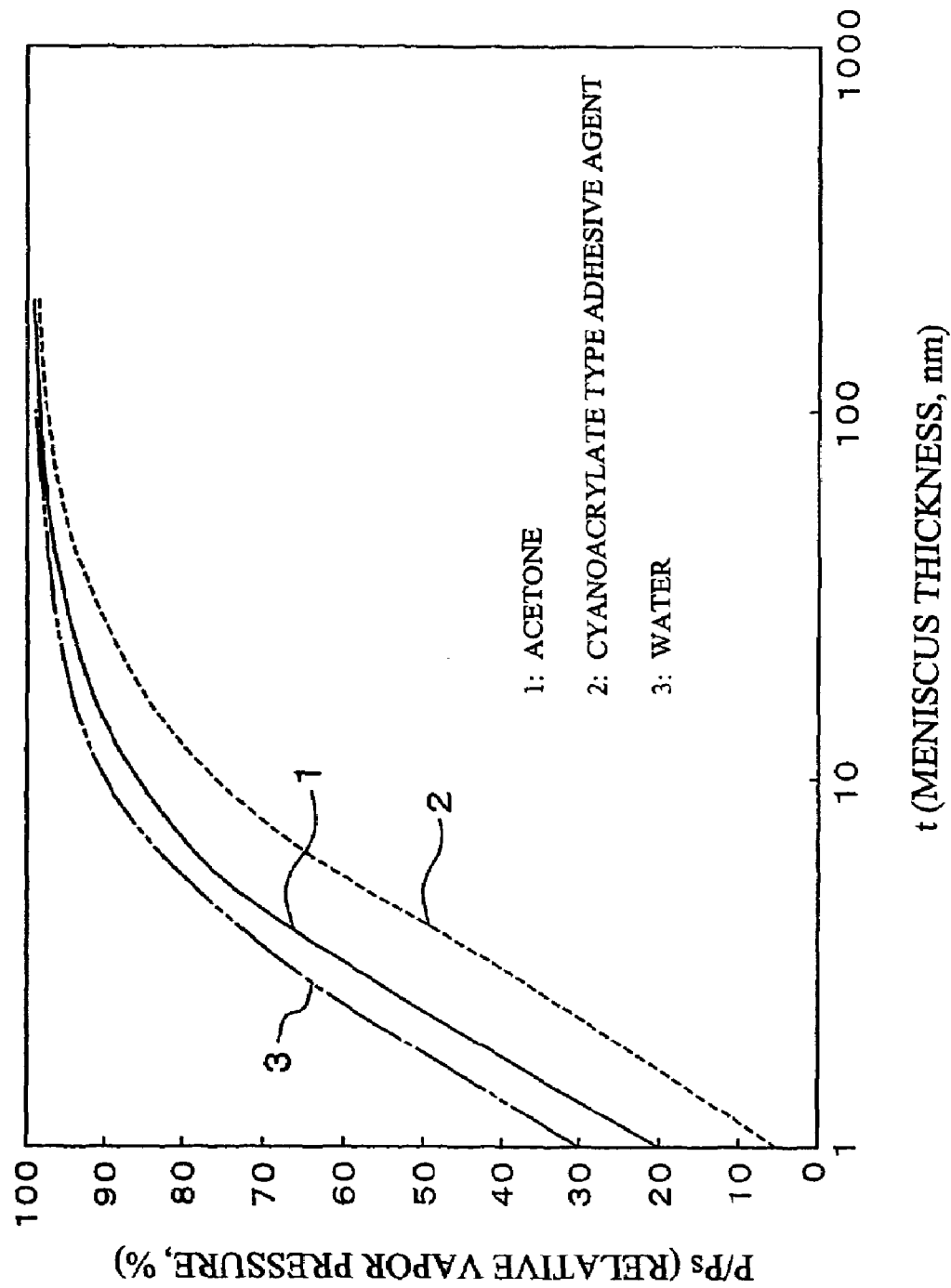
FIG. 5 is a graph showing the relationship between P/Ps (relative vapor pressure %) and t (thickness of meniscus, nm).

As shown in FIG. 5, if the relative vapor pressure of the atmosphere is set to a high value, the height of meniscus formed at the contact point is increased, so that the number of projections which can contribute to the bonding, that is, the contact area can be increased.

As described above, if the surface roughness is large and the number of projections contributing to the bonding is required to be increased, it is effective to increase the meniscus height. This is because if the meniscus height is increased, in accordance with the meniscus, meniscus is also formed at projections which do not come into contact with the partner surface. A relative vapor pressure of atmosphere required to achieve a desired meniscus height (a desired contact area is calculated by dividing a desired adhesion strength by the strength of the adhesive agent per unit area, and then the meniscus height corresponding to the contact area concerned is calculated from the equation 4) can be determined by using FIG. 5.

Furthermore, the size of the bonding targets to which the bonding method of the present invention is applicable will be described from another viewpoint, that is, on the basis of the relationship between the meniscus area (contact area) "A" and the weight "W".

As a measure for the size of the work described with reference to FIGS. 1 to 3, if the ratio (A/W) of the contact area (A) and the weight (W) of the work (sphere) is not less than $3.0 \times 10^{-9}$ (m²/g) in the case where the radius of the work (sphere) is equal to 5 mm, the bonding can be stably performed.

According to the present invention, from the considerations on the various sizes of the work (sphere), it has been found that the size of the bonding target to which the bonding method of the present invention is applicable is preferably set so that the ratio of A/W is larger than $0.75 \times 10^{-10}$ (m²/g) as a rough standard. "A" and "W" may be independently set so that the value of the ratio is satisfied.

The value of the ratio A/W may be calculated by the constants (W) of the actually bonded materials and the meniscus area (A) determined by the calculation under an atmosphere of about 60% in vapor pressure.

For example, when flat surfaces having some degree of roughness are bonded to each other, the meniscus area (A) may be calculated as follows.

First, the surface roughness of the works (bonding targets) is calculated, the average radius of the projections existing on the two flat surfaces (this may be easily calculated by AFM topography), and the equivalent radius thereof $[1/(r)=1/(r1)+1/(r2)]$ is calculated to calculate the meniscus area to each projection. Then, the meniscus area (A) is calculated on the assumption that the true contact area is equal to 1/25,000 of the apparent contact area.

As is apparent from the foregoing description, when two surfaces which are very rough are bonded to each other by the bonding method using the capillary condensation of the present invention, it is required to increase the meniscus area per projection in order to achieve firm adhesion strength, and in order to satisfy this requirement, the vapor pressure of the adhesive agent of the atmosphere is required to be increased.

Next, an apparatus for implementing the bonding method using the capillary condensation effect according to the present invention will be described with reference to FIGS. 6 and 7. It is needless to say that the present invention is not limited to an embodiment shown in the figures.

According to the bonding method of the present invention, works (bonding targets) are bonded to each other at a prescribed joint point under a vapor pressure atmosphere of adhesive agent as described above, and meniscus is formed at the joint point by subjecting the vapor of the adhesive agent to capillary condensation to bond the works to each other through the meniscus of the adhesive agent.

Figure 6:
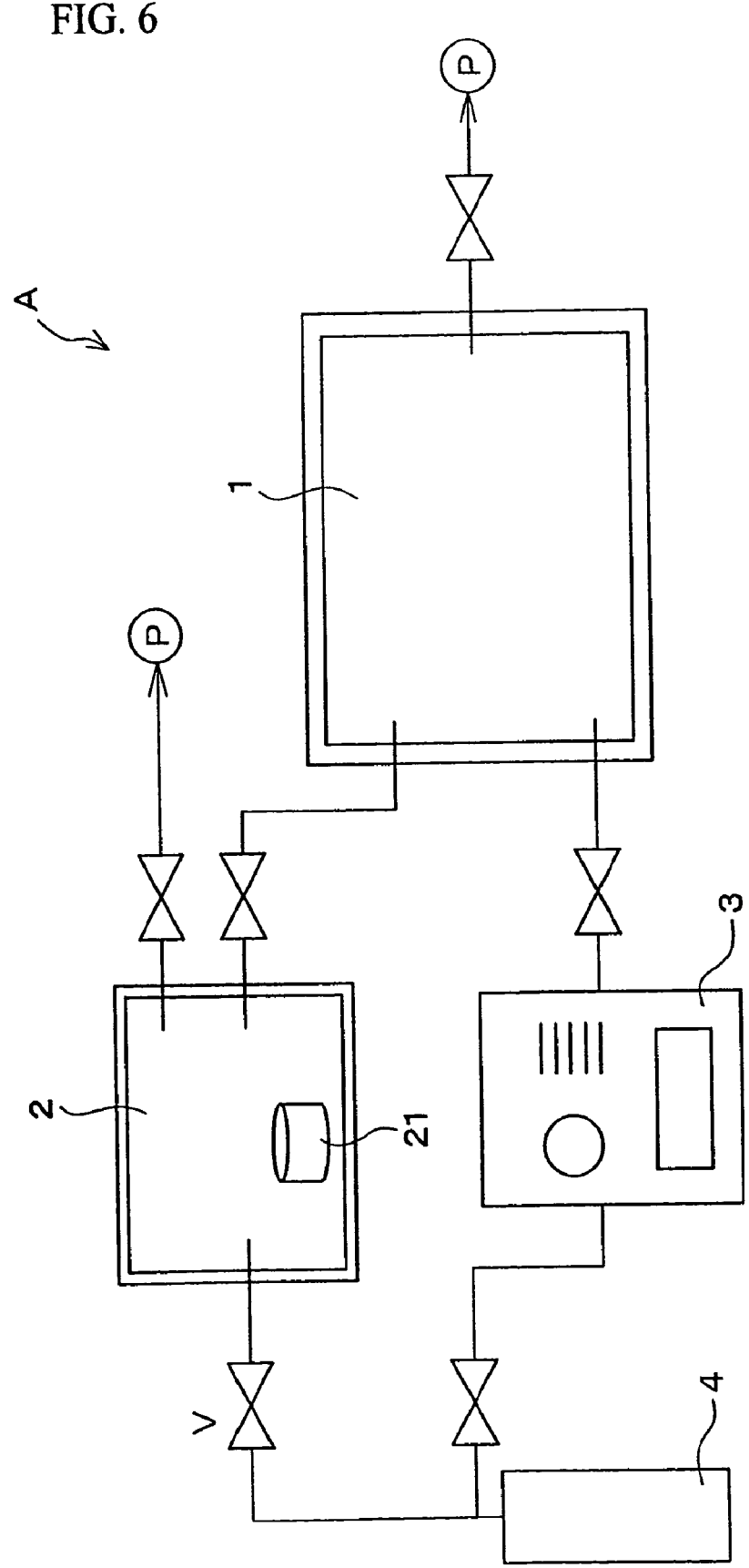
FIG. 6 is a diagram (overall block diagram) of an apparatus applied to a bonding method using a capillary condensation effect according to the present invention.
Figure 7:
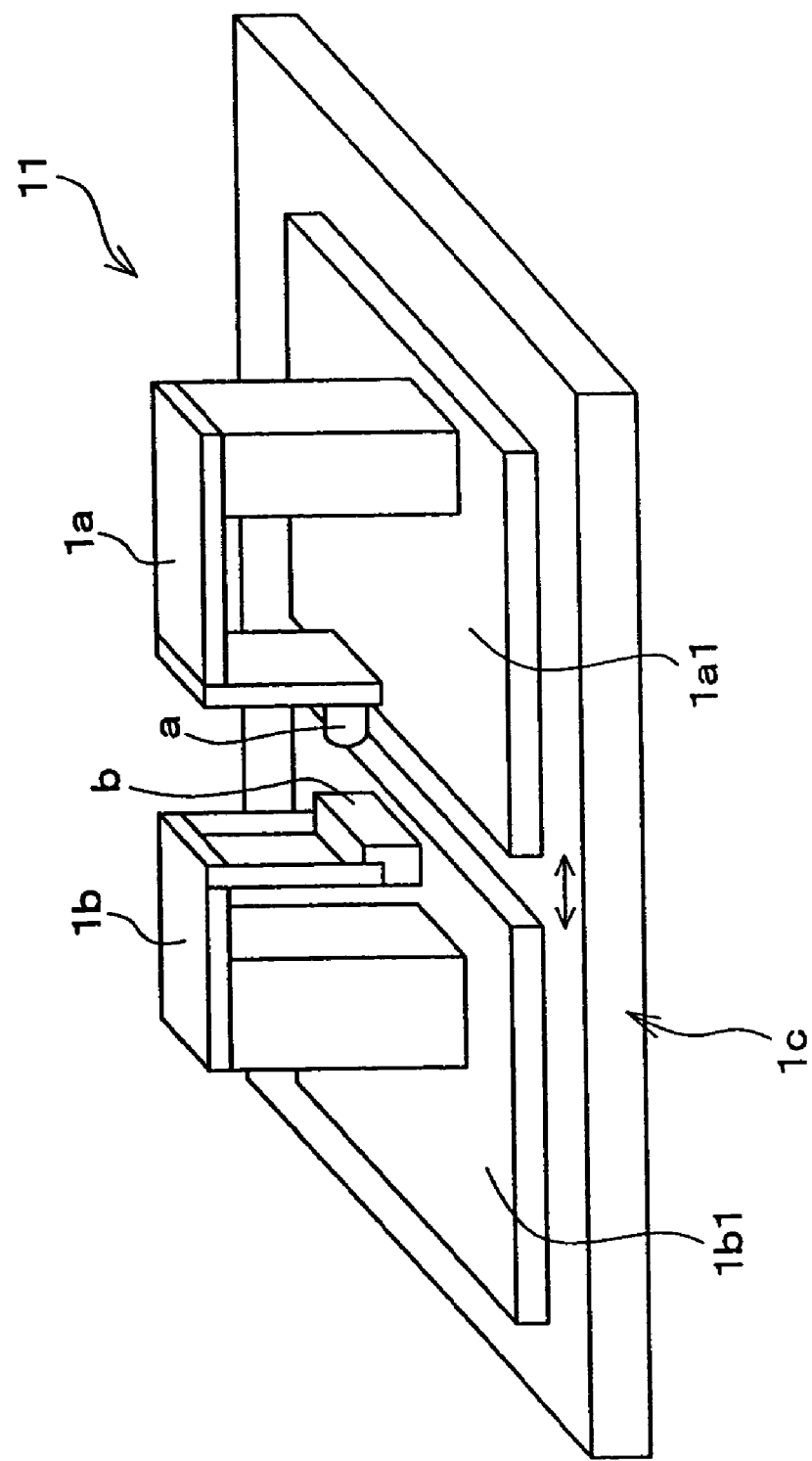
FIG. 7 is a perspective view showing a fixing jig (11) for a movable bonding target (work) disposed in a chamber (1) of FIG. 6.

Therefore, a apparatus shown in FIGS. 6 and 7 may be used as the apparatus to which the bonding method of the present invention is applied.

FIG. 6 is a diagram (block diagram) showing the overall apparatus (A) applied to the bonding method of the present invention.

FIG. 7 is a perspective view showing a work fixing jig (11) for a movable type bonding target (work) disposed in a chamber (1) of FIG. 6.

As shown in the figures, the apparatus (A) applied to the bonding method of the present invention comprises following large constituent elements:

(1) a chamber (1) disposed in the work fixing jig (11) for a movable type bonding target (work), (2) a chamber (2) in which a container of adhesive agent is disposed, (3) a humidifier (3) for supplying hardening agent (water) into the chamber (1) when the adhesive agent is of water-hardenable type, and (4) an inert gas cylinder (4) for keeping the overall apparatus (4) under the inert gas atmosphere.

As shown in the figures, the apparatus (A) is equipped with V (valve), P (pump), etc. to carry out gas suction/exhaust.

The details of the movable bonding target (work) fixing jig (11) disposed in the chamber (1) are shown in FIG. 7, and the mechanism thereof is apparent from FIG. 7.

As shown in FIG. 7, the work fixing jig (11) has a work fixing jig (1a) for fixing a pin (or ball) (a) corresponding to one of the bonding targets, and a work fixing jig (1b) for fixing a flat face work (b) corresponding to the other bonding target, and the work fixing jigs (1a) (1b) are fixed on movable stages (1a1) (1b1) which are movably disposed on a movable stage board (1c). By the mechanism of the work fixing jigs (11), the works (a, b) are brought into contact with each other at a predetermined contact point and a meniscus forming site is prepared.

In the chamber (2), the desired adhesive agent in the container (21) is processed by a heater, an evaporator, etc. (not shown) so that desired vapor pressure and desired vapor amount are achieved.

A method of achieving desired vapor pressure and vapor amount of adhesive agent will be described.

In this invention, the meaning of the term "adhesive agent" should be broadly interpreted. It means all the components contributing to adhesion, and it means not only original adhesive agent, but also solvent and hardening agent for the adhesive agent.

(1) In the case of photohardenable adhesive agent needing no solvent, the atmospheric temperature is controlled by an evaporator or the like so as to achieve desired vapor pressure and vapor amount, thereby controlling the vapor pressure, and the vapor concerned is mixed with dried nitrogen or the like from the gas cylinder (4) to establish a desired atmosphere for forming meniscus.

The foregoing description is applicable to a case where water-hardenable adhesive agent is used, meniscus of the adhesive agent is formed at a first stage, meniscus of water is further formed under a desired vapor pressure atmosphere at a second stage and then works are bonded to each other while hardening the adhesive agent.

(2) When solvent is needed, that is, when the adhesive agent comprises adhesive material and solvent for dissolving the adhesive agent, desired vapor pressure and vapor amount may be achieved on the basis of a composition having an azeotropic point from vapor-liquid equilibrium of a multi-component system.

The overall volume of the meniscus formed by subjecting vapor to capillary condensation is reduced as the vapor pressure or the vapor amount of the atmosphere is reduced.

There will be described hereunder how the meniscus contains a larger amount of adhesive components from the viewpoint of keeping preferable adhesion strength in the case of the multi-component system described above.

Now, the boiling point of the solvent is set to bp1, and the boiling point of the adhesive agent is set to bp2.

Furthermore, the temperature in the chamber (1) is set to Tc, the saturated vapor pressure and the vapor pressure of solvent at that time are set to Ps1, P1, and the saturated vapor pressure and the vapor thickness of the adhesive agent are set to Ps2, P2.

At this time, when the Kelvin radius (rκ) of meniscus (see the equations 1, 2) is a value which can be calculated from a thermodynamic equilibrium condition indicating the size of a gap in which liquid can exist under a prescribed relative humidity (in this case, the humidity is used for the solvent and the adhesive agent under the atmosphere), and the liquid can theoretically exit in the gap having the size corresponding to the Kelvin radius (rκ) insofar as the relative humidity is not equal to "0".

At this time, when a larger amount of adhesive agent is required to be condensed in the gap than the amount of solvent, by setting P2/Ps2 to be larger than P1/Ps1 at Tc as the atmosphere condition, a relative large amount of adhesive agent can be collected at the joint point, and large adhesion strength can be achieved.

In the bonding method using the capillary condensation of the present invention, if there is any meniscus-forming gap at a position other than the joint points of the respective elements (members, parts) to be bonded in a minute (micro) structure, the adhesive agent is condensed as liquid in such a gap, and thus it is needless to say that these sites are protected by masks or the like.

Next, the adhesive agent applied to the bonding method using the capillary condensation effect according to the present invention will be described.

In the bonding method of the present invention, the adhesive agent applied is not limited to a special one insofar as it forms meniscus at a joint portion through capillary condensation.

In general, adhesive agent having small mole volume is suitably used to effectively condense the vapor of the adhesive agent in a small gap at a joint point. In general, a no-solvent needing type or a type to which no hardening agent is required to be applied subsequently (as a second stage) is preferable.

As the adhesive agent applied to the bonding method of the present invention, various kinds of solvent (containing doped cement) having desired excellent dissolving power may be used for works which are formed of plastic (resin) and bonded to each other by dissolving the wall surfaces thereof at the joint point.

Other adhesive agent may be used: urea resin adhesive agent, melamine resin adhesive agent, phenol resin adhesive agent, epoxy resin adhesive agent, resorcinol resin adhesive agent, isocyanate resin adhesive agent, cyanoacrylate resin adhesive agent (containing photohardeble adhesive agent as acrylic adhesive agent) or the like.

The adhesion based on the adhesive agent as described above may be performed in a desired style.

For example, in the case of thermosetting type resin adhesive agent (thermosetting resin type adhesive agent such as urea, melamine, phenol, epoxy, resorcinol or the like), the adhesion may be performed by carrying out a heat treatment after condensation or condensing a mixture achieved by mixing adhesive agent with hardening agent in advance.

Damp-hardenable adhesive agent whose isocyanate groups react with water on the surface is known in the isocyanate resin adhesive agent group. When it is used, isocyanate resin is first condensed at the joint point by the capillary condensation or it is coated as a pre-treatment, meniscus is formed by migration, and then it is disposed under a damp air atmosphere to promote the condensation of water to the joint point, thereby hardening the resin for bonding.

The bonding method described above is applicable to the cyanoacrylate type adhesive agent.

In the case of photohardenable adhesive agent, after it is condensed (meniscus is formed), the hardening and the bonding may be carried out by irradiation.

In a case where works are formed of synthetic resin, after solvent suitable for resin to be bonded is condensed (meniscus is formed), the resin surface at the joint point may be dissolved and then dried to bond the works.

Next, applications of the bonding method using capillary condensation according to the present invention will be described. The following application is an example, and other applications can be readily understood. Further, the specific bonding methods of these applications will be described in embodiments described later.

(1) Bonding of quartz glass plate (flat plate) and quartz glass ball lens. This is important to manufacture an optical system (lens system).

(2) Bonding of a resin plate (flat plate) and a pin. This is important to manufacture a case for a micro acceleration sensor or the like, and fix a celluloid micro-gear or the like.

(3) Bonding of a silicon nitrogen sphere and an aluminum board. This is important to bond a slider for a disc type magnetic recording device and a (slider) suspension (formed of aluminum).

(4) Bonding of micro silica balls and a multi-crystal silicon board. This is important to manufacture a machine tool for achieving indentation shape (a tool used when a board having thickly-arranged micro silica balls is pressed against metal flat face or the like to achieve texturing).

(5) Bonding of a minute (micro) structure, respective elements (members, parts) of a micro machine type, such as a micro motor, micro turbine, a gear train, a micro gear, etc.

EMBODIMENTS

Embodiments of the bonding method using the capillary condensation effect according to the present invention will be described in more detail hereunder.

It is needless to say that the present invention is not limited to these embodiments.

Embodiment 1

A quartz glass plate and a quartz glass ball lens were used as works (bonding targets). Furthermore, an apparatus shown in FIGS. 6 and 7 was used.

The quartz glass plate and the quartz ball lens of 300 micrometer (μm) in radius were secured to a work fixing jig (11) shown in FIG. 7, brought into contact with each other by moving stages (1a1, 1b1) and disposed in the vacuum chamber (1) which was evacuated to vacuum to the extent that gas replacement could be performed as shown in FIG. 6.

Furthermore, a container (21) in which ultraviolet light hardenable adhesive resin was put was disposed in a chamber (2).

The flow amount of dry nitrogen flowing from an atmosphere gas cylinder (4) into the chamber (2), the pressure in the chamber (2) and the temperature of both the chambers (1, 2) were adjusted so that the vapor pressure of the ultraviolet light hardenable adhesive agent in the chamber (1) was equal to a proper value (for example, 60% of the saturated vapor pressure).

Subsequently, the dry nitrogen contained the vapor of the ultraviolet light hardenable adhesive agent was introduced into the chamber (1) to form meniscus of the ultraviolet light hardenable adhesive agent at the joint point of the works by the capillary condensation effect.

Thereafter, ultraviolet light was irradiated to the works through a viewport of the chamber (1) to harden the adhesive agent and bond the works.

The works thus bonded were firmly bonded to each other at the joint point under the optimum meniscus volume. The joint body thus manufactured was useful to manufacture an optical system (lens system) of a micro laser length measuring system.

Embodiment 2

A pin member and a flat plate which were formed of general plastic material such as celluloid or the like were used as works. That is, the joint points of the plastic members were dissolved by solvent (acetone), and bonded. The apparatus shown in FIGS. 6 and 7 was used.

The pin member was processed to have a radius of curvature of 500 micrometers (μm) at the tip thereof. The pin member and the flat plate was secured to the work fixing jig (11) shown in FIG. 7, brought into contact with each other by moving the stages (1a1, 1b1) and disposed in the vacuum chamber (1) which was evaporated to vacuum to the extent that the gas replacement could be performed.

Furthermore, a container (21) in which acetone (adhesive agent defined in this invention) was put was disposed in the chamber (2).

The flow rate of dry nitrogen flowing into the chamber (2), the pressure in the chamber (2) and the temperature of both the chambers (1, 2) were adjusted so that the acetone vapor pressure in the chamber (1) was set to a proper value (for example, 60% or more of the saturated vapor pressure).

Subsequently, the dry nitrogen containing acetone vapor was introduced into the chamber (1), and meniscus of acetone was formed at the joint point between the works by the capillary condensation effect. Only the joint was dissolved by acetone because celluloid type plastic was dissolved by acetone, and by introducing the dry nitrogen from another flow passage, condensed acetone was vaporized and the bonding was completed. The works were bonded to each other with sufficient adhesion strength.

Embodiment 3

The same bonding as the embodiment 2 was carried out by using as works an aluminum board and a silicon nitride ball which was coated with thin-film acetyl cellulose on the surface thereof by using a dip coat method. In this bonding process, the works could be bonded with sufficient adhesion strength.

Embodiment 4

Damp-hardenable polyisocyanate type adhesive agent or cyanoacrylate type adhesive agent were used as adhesive agent, and micro silica balls and a multi-crystal silicon board were used as works. Meniscus of the adhesive agent was first formed at the joint point of the works, and then meniscus of water (hardening agent) was formed at the joint point under damp nitrogen atmosphere, thereby bonding the works.

Specifically, the micro silica balls of 100 microns (μ) in diameter were dispersed on the multi-crystal silicon board (silicon wafer).

Thereafter, the above board dispersed with the micro silica balls was disposed in the vacuum chamber (1), and the vacuum chamber (1) was evaporated to the extent that gas replacement could be performed.

A container (21) in which damp (water) hardenable polyisocyanate type adhesive agent or cyanoacylate type adhesive agent was put was disposed in the chamber (2).

The flow rate of dry nitrogen flowing into the chamber (2), the pressure in the chamber (2) and the temperature of both the chambers (1, 2) were adjusted so that the vapor pressure of the adhesive agent in the chamber (1) was set to a proper value.

Subsequently, the dry nitrogen containing the vapor of the adhesive agent was introduced into the chamber (1), and meniscus was selectively formed only around the true contact points of the silicon wafer and the micro silica balls serving as the works.

Thereafter, damp nitrogen was introduced from another flow passage through a humidifier (3), water was condensed at only the joint points to form meniscus of water (hardening agent) and the adhesive agent was hardened to bond the works to each other.

At this time, the silica balls which come into contact with one another on the silicon wafer were also bonded to each other at the contact points.

The adhesion body thus achieved was bonded with sufficient adhesion strength, and useful as a machine tool to achieve an indentation shape for texturing.

INDUSTRIAL APPLICABILITY

According to the present invention, in the manufacturing of a minute (micro) structure, that is, in the manufacturing of a minute (micro) structure comprising plural (members, parts) which are small in dimension, the joint point between the respective elements (members, parts) of small dimension can be bonded efficiently and economically bonded.

That is, according to the bonding method of the present invention, uniform meniscus of adhesive agent is formed at the joint point between the respective elements (members, parts) of small dimension by capillary condensation, and the respective elements (members, parts) are bonded to each other through the meniscus concerned, so that a bonding member having sufficient adhesion strength can be efficiently and economically manufactured with very high yield.

The invention claimed is:

1. A bonding method using a capillary condensation effect for bonding at least two separate bonding targets consisting of dry resinous material at a prescribed joint point of said at least two separate bonding targets, said method consisting of the ordered steps of:

contacting said at least two separate bonding targets at a prescribed joint point, disposing said at least two separate bonding targets, which are contacted with each other at said joint point, under an atmosphere consisting of a prescribed vapor pressure of an adhesive agent consisting of a solvent that dissolves surfaces of said at least two separate bonding targets, and subjecting vapor of the adhesive agent to a capillary condensation at said joint point and a neighborhood thereof to form a meniscus consisting of the adhesive agent, thus bonding at least two separate bonding targets to each other by the adhesive agent consisting solely of the meniscus.

2. The bonding method according to claim 1 wherein the adhesive agent consists of a solvent for dissolving the surface of said resinous material which is acetone.

3. A bonding method using a capillary condensation effect for bonding at least two separate bonding targets consisting of a dry resinous material at a prescribed joint point of said at least two separate bonding targets, said method consisting of the ordered steps of:

contacting said at least two separate bonding targets at a prescribed bonding point, disposing said at least two separate bonding targets, which are contacted with each other at said joint point, under an atmosphere consisting of a prescribed vapor pressure of an adhesive agent consisting of a solvent that dissolves surfaces of said at least two separate bonding targets, and subjecting vapor of the adhesive agent to a capillary condensation at said joint point and a neighborhood thereof to form a meniscus consisting of the adhesive agent, thus bonding said at least two separate bonding targets to each other by the adhesive agent consisting solely of the meniscus;

wherein said at least two separate bonding targets have a dimension of several millimeters or less; and on an assumption that a contact between said at least two separate bonding targets is regarded as a contact between flat surfaces and a ratio ($S_1/S_2$) of a true contact area ($S_1$) to an apparent contact area ($S_2$) at the joint point is in an order of 1/25,000 or less.

4. A bonding method using a capillary condensation effect for bonding at least two separate bonding targets consisting of a dry resinous material at a prescribed joint point of said at least two separate bonding targets, said method consisting of the ordered steps of:

contacting said at least two separate bonding targets at a prescribed bonding point, disposing said at least two separate bonding targets, which are contacted with each other at said joint point, under an atmosphere consisting of a prescribed vapor pressure of an adhesive agent consisting of a solvent that dissolves surfaces of said at least two separate bonding targets, and subjecting vapor of the adhesive agent to a capillary condensation at said joint point and a neighborhood thereof to form a meniscus consisting of the adhesive agent;

thus bonding said at least two separate bonding targets to each other by the adhesive agent consisting solely of the meniscus;

wherein said at least two separate bonding targets have a dimension of several millimeters or less;

said at least two separate bonding targets are a spherical body and a flat surface body which are equal to several millimeters or less in dimension, and a ratio (A/W) of a meniscus area (A) at the joint point to a weight (W) of the spherical body satisfies a formula:

$$(A/W) > 0.75 \times 10^{-10} \, (m^2/g).$$

* * * * *